(12) United States Patent
Pan et al.

(10) Patent No.: US 10,891,271 B2
(45) Date of Patent: Jan. 12, 2021

(54) OPTIMIZED EXECUTION OF QUERIES INVOLVING EARLY TERMINABLE DATABASE OPERATORS

(71) Applicant: Oracle International Corporation, Redwood Shores, CA (US)

(72) Inventors: Yi Pan, Hangzhou (CN); Srikanth Bellamkonda, Mountain View, CA (US); Madhuri Kandepi, Cupertino, CA (US)

(73) Assignee: Oracle International Corporation, Redwood Shores (CA)

(*) Notice: Subject to any disclaimer, the term of this patent is extended or adjusted under 35 U.S.C. 154(b) by 267 days.

(21) Appl. No.: 15/989,560

(22) Filed: May 25, 2018

(65) Prior Publication Data

US 2019/0361996 A1 Nov. 28, 2019

(51) Int. Cl.
*G06F 7/00* (2006.01)
*G06F 16/21* (2019.01)
*G06F 16/27* (2019.01)

(52) U.S. Cl.
CPC .............. *G06F 16/21* (2019.01); *G06F 16/27* (2019.01)

(58) Field of Classification Search
CPC ........................... G06F 16/90335; G06F 16/21
See application file for complete search history.

(56) References Cited

U.S. PATENT DOCUMENTS

| | | | | |
|---|---|---|---|---|
| 6,009,265 A * | 12/1999 | Huang | ............... | G06F 16/24532 |
| 7,103,590 B1 * | 9/2006 | Murthy | .............. | G06F 16/24553 |
| 7,249,140 B1 * | 7/2007 | Korenevsky | ............ | G06F 16/20 |
| | | | | 707/602 |
| 7,720,838 B1 * | 5/2010 | Li | ..................... | G06F 16/24557 |
| | | | | 707/713 |
| 8,903,779 B1 * | 12/2014 | Holenstein | .......... | G06F 11/1469 |
| | | | | 707/685 |
| 2002/0194157 A1 * | 12/2002 | Zait | ................... | G06F 16/24557 |

(Continued)

OTHER PUBLICATIONS

Oracle® Database, "VLDB and Partitioning Guide", 11g Release 2 (11.2), dated Sep. 2011, 69 pages.

*Primary Examiner* — Eliyah S. Harper
(74) *Attorney, Agent, or Firm* — Hickman Palermo Becker Bingham LLP (57) ABSTRACT

According to embodiments, a multi-node database management system allows consumer processes ("consumers") implementing a portion of a distributed data-combination operation to independently send a STOP notification to corresponding producer processes ("producers"). Upon a given consumer determining that the consumer requires no further information from corresponding producers, the consumer sends a STOP notification to the producers. When a given consumer sends out a STOP notification, the producers drop any data destined for the given consumer and also stops preparing data for and sending rows to the given consumer. Furthermore, once the producers receive STOP notifications from all of the consumers corresponding to the producers, the producers stop the current sub plan execution immediately without requiring completion of the sub plan. Thus, embodiments significantly improve the query execution performance by avoiding scanning and distributing data that is not needed for execution of the distributed operation.

16 Claims, 6 Drawing Sheets

(56) References Cited

U.S. PATENT DOCUMENTS

| | | | |
|---|---|---|---|
| 2002/0196260 A1* | 12/2002 | Candler | G06T 1/60 345/531 |
| 2005/0222965 A1* | 10/2005 | Chaudhuri | G06F 16/217 |
| 2006/0218123 A1* | 9/2006 | Chowdhuri | G06F 16/24532 |
| 2007/0078812 A1* | 4/2007 | Waingold | G06F 16/24542 |
| 2009/0144228 A1* | 6/2009 | Duffy | G06F 16/90339 |
| 2010/0312762 A1* | 12/2010 | Yan | G06F 16/24534 707/716 |
| 2014/0214800 A1* | 7/2014 | Liang | G06F 16/24553 707/718 |
| 2014/0280298 A1* | 9/2014 | Petride | G06F 16/24553 707/769 |
| 2017/0116271 A1* | 4/2017 | Ziauddin | G06F 16/24539 |
| 2018/0096001 A1* | 4/2018 | Soza | G06F 16/2358 |
| 2018/0107713 A1* | 4/2018 | Aldrich | G06F 16/248 |
| 2018/0165335 A1* | 6/2018 | Kong | G06F 16/24537 |

* cited by examiner

202 — GENERATE AN EXECUTION PLAN TO EXECUTE A DISTRIBUTED OPERATION OVER TWO DATABASE OBJECTS, WHERE THE EXECUTION PLAN INCLUDES BOTH (A) A TABLE SCAN OPERATOR THAT TARGETS A PARTICULAR DATABASE OBJECT OF THE TWO DATABASE OBJECTS, AND (B) A SECOND OPERATOR THAT CONSUMES RESULTS OF THE TABLE SCAN OPERATOR

204 — ASSIGN A FIRST SET OF PARALLEL EXECUTION PROCESSES, OF THE CLUSTER OF COMPUTING DEVICES, TO PERFORM A FIRST OPERATION THAT CORRESPONDS TO THE TABLE SCAN OPERATOR

206 — ASSIGN A SECOND SET OF PARALLEL EXECUTION PROCESSES, OF THE CLUSTER OF COMPUTING DEVICES, TO PERFORM A SECOND OPERATION THAT CORRESPONDS TO THE SECOND OPERATOR

208 — A FIRST PROCESS, OF THE FIRST SET OF PARALLEL EXECUTION PROCESSES, BEGINS TO PRODUCE RESULTS FOR A SECOND PROCESS, OF THE SECOND SET OF PARALLEL EXECUTION PROCESSES, FOR A RESPECTIVE PORTION OF THE FIRST OPERATION BY SCANNING A PORTION OF THE PARTICULAR DATABASE OBJECT

210 — DETERMINING, PRIOR TO THE FIRST PROCESS COMPLETING PERFORMANCE OF THE RESPECTIVE PORTION OF THE FIRST OPERATION, THAT THE SECOND PROCESS DOES NOT REQUIRE ANY ROWS PRODUCED BY THE FIRST OPERATION

212 — THE SECOND PROCESS SENDS A NOTIFICATION TO THE FIRST PROCESS

214 — IN RESPONSE TO RECEIVING THE NOTIFICATION, THE FIRST PROCESS CEASES TO PRODUCE RESULTS, FOR THE SECOND PROCESS, OF THE RESPECTIVE PORTION OF THE FIRST OPERATION

USUS 10,891,271 B2

OPTIMIZED EXECUTION OF QUERIES INVOLVING EARLY TERMINABLE DATABASE OPERATORS

FIELD OF THE INVENTION

The present invention relates to optimizing data distribution and execution, in a multi-node database management system, for database commands that involve early terminable database operators.

BACKGROUND

Database servers commonly receive commands (such as set operations, join operations, etc.) that require data-combination operations that combine multiple different sets of results. For example, a join operation is used to combine multiple tables so that data from those tables may be selected in a query. A query that joins two tables may specify how the tables are joined using join criteria. A join operation comprises merging each row in a first table with each row of a second table that matches the join criteria. For example, a query may specify that rows in the first table only join with rows in a second table when rows in the first table have a value in a particular column that equals the value in a particular column of rows in the second table.

As another example, a minus set operation is used to remove data, present in a first set, from a second set. To illustrate, execution of a particular minus set operation "A minus B", where A={1, 2, 3, 4, 3, 4} and B={1, 3, 1}, results in a result set {2, 4}.

Database servers may rely on a two-phase method of performing a data-combination operation over two sets of data (e.g., from tables, views, etc.). In a first phase, known as the "build phase," the database server generates a first set of data, referred to herein as the build table. According to embodiments, the build table may be implemented by any access structure, such as a table, a tree, a buffer, a hash table, etc. In a second phase, known as the "probe phase," the database server iteratively probes into the access structure (referred to herein as a probe table) to scan through the set of data to be combined.

Distributed data-combination operations can be used to combine data from tables that are distributed horizontally among multiple nodes implementing a multi-node database management system. Also, in the case of a shared-resources multi-node system in which a table involved in a join operation is stored in shared resources rather than being distributed horizontally among multiple nodes, distributed data-combination operations can be used to spread the work of such an operation across the nodes of the system. In either case, distribution of a data-combination operation allows chunks of the operation to be executed, by the various nodes of a distributed system, in parallel.

Generally, for a query to be executed in parallel, a Query Coordinator generates an execution plan and divides the execution plan into sub plans. These sub plans are scheduled to be executed in some specific order, and are assigned to parallel execution processes in that order. Since the scheduling order is static, every sub plan must be executed by the assigned parallel execution process, even when execution of some sub plans becomes logically unnecessary. For example, if a join operation joins two tables (table_1 and table_2), and a scan of table_1 produces 0 rows, execution of the join does not require a scan of table_2 given that the join operation will produce no rows because of the 0 rows found for the join in table 1.

In the context of a data-combination operation being executed serially by a single node, the node simply skips the sub plans that are found to be logically unnecessary (such as the scan of table_2 in the join example above). Such simple skipping of a sub plan is relatively complicated in the context of parallel execution of a data-combination operation. Continuing with the previous example, for parallel execution, multiple producer processes scan table_2 while multiple consumer processes receive the results of the producer processes and concurrently perform the join to results from table_1. The fact that there are no rows in the build table that the consumer processes have been tasked to join to the results of the scan of table_2 is unknown to the producer processes because the producer and consumer processes, implementing portions of the database command, respectively only have information about the sub plans assigned to them by the Query Coordinator.

Generally, when a given consumer process, implementing a portion of a given distributed data-combination operation, determines that there is no data in the build table, the consumer process simply drops any rows received from producer processes. This technique requires the producer processes to complete their assigned processing and to unnecessarily send results (i.e., over a network, or via disk-based communications) to the given consumer process, which wastes CPU of the producer process and also potentially wastes network bandwidth to deliver unneeded rows. Furthermore, if all of the consumer processes that are processing data for a distributed data-combination operation determine that there is no data in the build table maintained for any of the consumer processes, then all of the producing side processing power is wasted in processing the data for the data-combination operation.

Thus, it would be beneficial to be able to limit, for a distributed data-combination operation, the processing of producer processes to generate, and send over the network, only those results that are needed by the consumer processes to implement the operation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to embodiments, a multi-node database management system implements a stop notification framework, which allows consumer processes implementing a portion of a distributed data-combination operation to independently send a STOP notification to corresponding producer processes. Specifically, upon a given consumer process determining that the build table maintained by the consumer process contains no data, meaning that the consumer process requires no further information from corresponding producer processes, the consumer process sends a STOP notification to the producer processes.

When a given consumer process sends out a STOP notification, the producer processes drop any data destined for the given consumer process and also stops preparing data for and sending rows to the given consumer process. Thus, embodiments save computing resources that would be needed to prepare unneeded rows for the consumer process, and also conserves network bandwidth by allowing producers to send, to consumers, only those rows that are needed for the distributed operation by the consumer processes.

Furthermore, once the producer processes receive STOP notifications from all of the consumer processes corresponding to the producer processes, the producer processes stop the current sub plan execution immediately without requiring completion of the sub plan. Thus, embodiments significantly improve the query execution performance by allowing the consumer processes to make local determinations of the necessity of continuing to receive data from the producer processes and, upon all consumer processes determining that it is no longer necessary to receive data from producer processes, cutting the sub plan being executed by producer processes short, which avoids scanning and distributing data, by producer processes, that is not needed for execution of the distributed operation. This technique can result in significant savings of computing resources, such as CPU, network, and memory.

Parallel Execution

Figure 1:
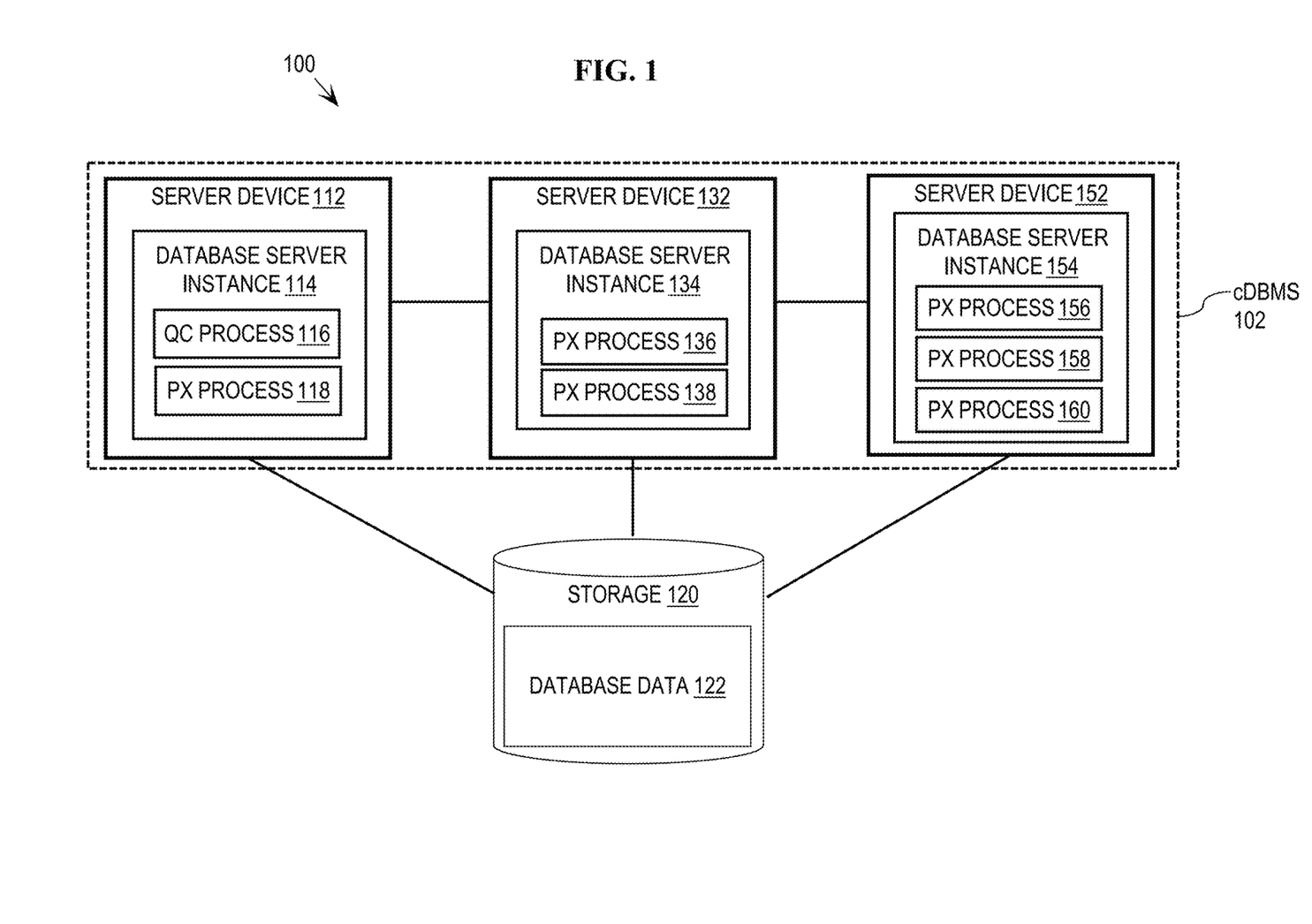
FIG. 1 depicts an example multi-node database system on which embodiments may be implemented.

According to embodiments, a multi-node (or cluster) database management system (cDBMS) 102, as depicted in FIG. 1, employs a query coordinator (QC) process and parallel execution (PX) server processes to implement parallel execution of any given database command. The QC process initiates a given database command to be executed in parallel, and the PX processes run on the cluster of nodes that implement the cDBMS and perform work in parallel as slave processes. The QC process distributes the work to the PX processes, and may perform a minimal, mostly logistical, portion of the work that cannot be executed in parallel. For example a parallel query with a SUM( ) operation requires adding the individual sub-totals calculated by each parallel server processes.

The QC process generates an execution plan and divides the execution plan into sub plans. These sub plans are scheduled to be executed in some specific order, and are assigned to PX processes in that order. The number of sub plans is normally much higher than a degree of parallelism for the database command, either requested by a given database command or automatically determined by cDBMS 102, in order to get an even distribution of work among the PX processes. Each PX process works exclusively on its portion of an assigned sub plan, and when a given PX process finishes its assigned portion, the QC gives the given PX process another sub plan to work on until all of the sub plans have been completed.

In order to execute a statement in parallel efficiently, PX processes work together on sub plans in sets: one set produces rows (producer) and another set consumes the rows (consumer). For example, cDBMS 102 receives a particular distributed command that requires a table scan operation and also an operation that processes results of the table scan. Thus, cDBMS 102 causes a first set of PX processes, from a pool of slave processes maintained by cDBMS 102, to implement a sub plan that scans the table. Also, cDBMS 102 causes a second set of PX processes, from the pool, to concurrently implement a second sub plan that processes the results of the table scan operation. Processes in the first set of PX processes have taken on the role of producers because they produce results that are required by the second set of PX processes, which have taken on the role of consumers.

Data Redistribution

In order to process a distributed operation in parallel, redistribution of rows between the producers and the consumers becomes necessary. As indicated by the sub plan assigned to the producers, the producer processes scan the table, e.g., based on block ranges, and apply any WHERE clause predicates required by the database command to produce a set of resulting rows. Then the data produced by the producers is redistributed in that the producers send the set of resulting rows to the consumers, who complete the distributed operation.

Embodiments employ any redistribution method, such as one of the following redistribution methods. These methods are described in the context of an example operation type, but are generally applicable to any distributed data-combination operation.

HASH: Hash redistribution, which helps to achieve an equal distribution among the parallel server processes. Producer processes apply a hash function to the join column and the result dictates which consumer process should receive the row.

BROADCAST: Broadcast redistribution happens when one of the two result sets in a join operation is much smaller than the other result set. Instead of redistributing rows from both result sets, the cDBMS sends the smaller result set to all of the consumer processes in order to guarantee the individual processes are able to complete their join operation.

RANGE: Range redistribution, which is used for parallel sort operations. Individual PX processes work on data ranges so that the QC process does not have to do any additional sorting, but presents the individual PX processes results in the correct order.

KEY: Key redistribution ensures result sets for individual key values are clumped together. This is an optimization that is used for partial partition-wise joins to ensure only one side in the join has to be redistributed.

ROUND ROBIN: Round-robin data redistribution can be the final redistribution operation before sending data to the requesting process. It can also be used in an early stage of a query when no redistribution constraints are required.

Early-Terminable Database Commands

Embodiments significantly reduce CPU, memory, and network bandwidth requirements for parallel query execution for early-terminable database operations. Specifically, embodiments conserve computing resources by avoiding unnecessary work of query sub plan execution as determined locally by processes implementing the query sub plan.

Figure 2:
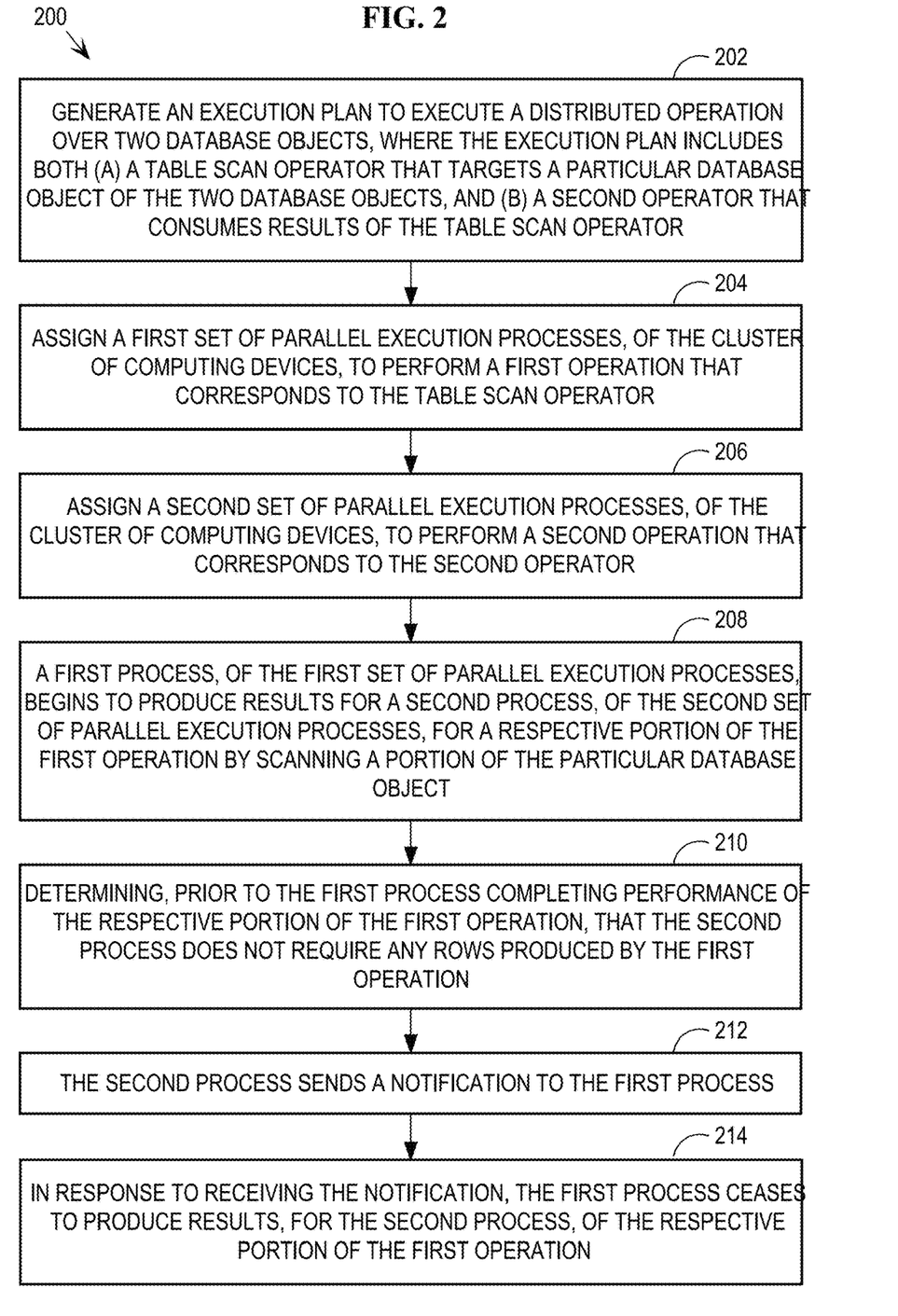
FIG. 2 depicts a flowchart for optimizing data distribution, in a multi-node database management system, for database commands that involve early terminable database operators.

According to embodiments, a consumer PX process communicates with producer PX processes to inform the producer PX processes that the consumer has determined that it no longer needs the results being produced. The producer PX processes use that information to reduce unneeded communications between the producers and the consumer, and at times to eliminate unneeded processing of the sub plan being executed by the producers. FIG. 2 depicts a flowchart 200 for optimizing data distribution and execution, in a multi-node database management system, for database commands that involve early terminable database operators.

Specifically, at step 202 of flowchart 200, an execution plan to execute a distributed operation over two database objects is generated, where the execution plan includes both (a) a table scan operator that targets a particular database object of the two database objects, and (b) a second operator that consumes results of the table scan operator. For example, a user process creates a connection to cDBMS 102 (FIG. 1) at database server instance 114 on server device 112, which initiates a session for the user process being served by a QC process 116. The user process submits a database command, via the established connection, to the session. For example, the user process submits the following Query 1 (with a degree of parallelism of 3) to the session:

Query 1: SELECT *
  FROM tab1 INNER JOIN tab2
  ON tab1.column_name=tab2.column_name Embodiments are described in connection with a join operation being implemented using hash redistribution. However, embodiments may be implemented with any database operator (such as union, intersect, minus, etc.) that is implemented, at least in part, by an operation that involves consumers whose task is to process data being produced by particular producers, i.e., a data-combination operation. Further, embodiments may be implemented in a system utilizing any redistribution method. Also, the database objects involved in embodiments may be tables, views, etc.

Continuing with the above example, in response to receipt of this database command, QC process 116 generates an execution plan to execute Query 1. The execution plan includes a probe phase that involves (a) a table scan operator that scans tab2, and (b) a join operator that joins the results of the table scan of tab2 to rows in a build table populated by a (previously-executed) build phase of the execution plan, i.e., from tab1. Referring to the language of step 202, the join operator represents the second operator, which consumes the results of the table scan operator that scans table tab2 by joining the results to rows in a build table.

At step 204, a first set of parallel execution processes, of the cluster of computing devices, are assigned to perform a first operation that corresponds to the table scan operator. Continuing with the previous example, QC process 116 assigns three processes, from a pool of available PX processes maintained by cDBMS 102, to perform a scan of table tab2 as indicated by the table scan operator. To illustrate, cDBMS 102 maintains a pool of processes that are available to act as slave processes, which pool includes PX processes 118, 136, 138, 156, 158, and 160. QC process 116 assigns PX processes 118, 156, and 158 to perform the table scan of tab2. Once assigned to the table scan operation, PX processes 118, 156, and 158 are removed from the pool of available PX processes, and they also assume the session variables of QC process 116.

At step 206, a second set of parallel execution processes, of the cluster of computing devices, are assigned to perform a second operation that corresponds to the second operator. For example, QC process 116 assigns PX processes 136, 138, and 160 to perform a join operation indicated by the join operator that joins the results of the table scan of tab2 (being performed by PX processes 118, 156, and 158) to rows in a build table, i.e., populated from tab1.

Figure 3A:
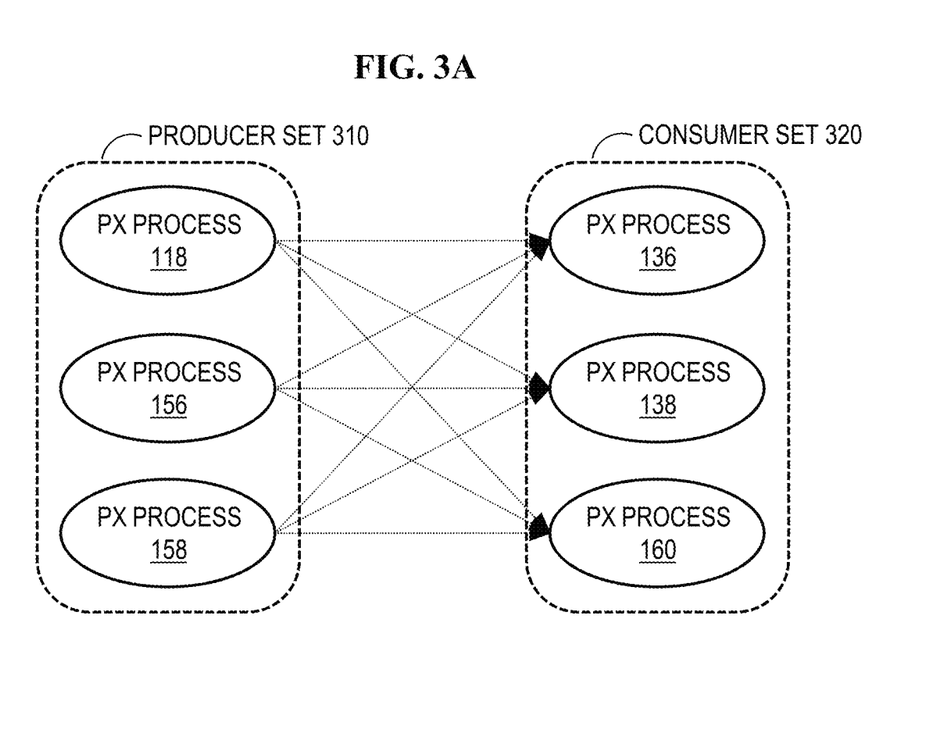
FIGS. 3A and 3B depict sets of consumer processes and producer processes interacting to implement at least a portion of a database operation.

At step 208, a first process, of the first set of parallel execution processes, begins to produce results for a second process, of the second set of parallel execution processes, for a respective portion of the first operation by scanning a portion of the particular database object. For example, FIG. 3A depicts a producer set 310 of PX processes (referred to herein as "producer PX processes"), including PX processes 118, 156, and 158. As depicted in FIG. 3A by the dotted lines connecting the processes in producer set 310 with the processes in a consumer set 320 of PX processes (referred to herein as "consumer PX processes") that includes PX processes 136, 138, and 160, the producer PX processes are, prior to receiving any STOP notifications as described below, configured to send results to all of the consumer PX processes. As such, PX processes 118, 156, and 158 initiate the table scan of tab2 to produce a results set of rows from tab2 for the consumer PX processes to join with any rows in the build table.

At step 210, it is determined, prior to the first process completing performance of the respective portion of the first operation, that the second process does not require any rows produced by the first operation. For example, prior to the producer PX processes completing the scan of tab2, PX process 136 determines that there are no rows in the build table being maintained by PX process 136.

According to one or more embodiments, prior to PX process 136 determining that there are no rows in the build table, one or more of the producer PX processes send at least some rows to one or more of the consumer PX processes as part of performing the table scan of tab2. However, since the table scan of tab2 is not yet complete when PX process 136 determines that there are no rows in the build table, the producer PX processes have not yet sent all rows that they potentially could send to the consumer PX processes, in connection with the table scan, at the time of the determination.

As a further example of step 210, in the context of an anti-join, semi-join, or minus operation, a build table maintained by PX process 136 contains data at the beginning of execution of the sub plan assigned to PX process 136. However, as PX process 136 probes into the build table, PX process 136 removes entries from the build table, i.e., based on join optimization techniques such as removing rows from the build table that have already participated in the join. In this way, a consumer PX process may determine, after starting its assigned task, that the consumer PX process no longer requires any rows produced by the producer PX processes because the build table has been drained of all rows during the course of consumer processing.

Steps 212 and 214 of flowchart 200 are responsive to the determination of step 210. Specifically, at step 212, the second process sends a notification to the first process. For example, in response to determining that the build table maintained by PX process 136 is empty of rows, PX process 136 sends a network flow control message with a STOP notification to all PX processes of producer set 310, which indicates that PX process 136 does not require results of the table scan operation being performed by the producer PX processes.

According to an embodiment, a consumer process implementing a portion of a given join operation, which has determined that the build table is empty of rows, sends a STOP notification to less than all of the producer PX processes producing rows for the join operation. To illustrate, a particular set of producer PX processes operate under an execution scheme for a given join operation that divides the producer PX processes into groups in such a way that all producers in a given group are on the same node. Consumer PX processes working under the same execution scheme are divided into groups similarly. In this case, all consumers in a given group residing on a particular node receive data from only those consumers, in a corresponding group, which reside on the same particular node. As such, consumers that do not need any further rows from the producers (as described in detail above) send STOP notifications to only those producers residing on the same node (and not to any producers that reside on nodes other than the particular node). Because the production and consumption is node-specific in this embodiment, the producers on a given node stop packing and sending rows altogether (as described in detail below) in response to receiving STOP notifications from all consumers on the node.

At step 214, in response to receiving the notification, the first process ceases to produce results, for the second process, of the respective portion of the first operation. For example, PX process 118 receives the STOP notification from PX process 136.

In response to receiving the STOP notification, PX process 118 drops any rows that PX process 118 had previously prepared to be sent to PX process 136, and also ceases preparing rows to send to PX process 136. Dropping rows based on receipt of STOP notifications reduces CPU consumption by avoiding the need to pack unwanted rows into network buffers. Furthermore, using the STOP notification to avoid sending unneeded rows to the consumer processes reduces the network bandwidth requirements of the distributed operation.

In response to receiving the STOP notification, PX process 118 also records the information from STOP notification, at least including the identity of the PX process 136, which sent the STOP notification. According to further embodiments, a producer PX process also increments a STOP counter upon receipt of a STOP notification from a consumer PX process that has not sent out a STOP notification before, as described in further detail below.

According to an embodiment, each producer PX process includes a callback procedure that is configured to handle STOP notifications from consumer PX processes. In this embodiment, the callback procedure performs those steps performed in response to receiving a STOP notification and attributed to producer PX processes herein. Specifically, when a producer PX process receives a STOP notification in a network flow control message, the producer PX process calls its registered callback function to handle the STOP notification.

Stop Notifications Received from Less than all Consumer Processes

According to an embodiment, the producer PX processes cease to send results, to PX process 136, based on the identity of PX process 136 recorded in connection with the receipt of the STOP notification from the consumer PX process. Specifically, each of the producer PX processes maintains a respective list of consumer PX processes to which the respective PX process is required to send results of the table scan operation.

Each producer PX process also maintains a STOP list that records identifiers of those consumer PX processes that have sent a STOP notification to the producer PX processes. According to an embodiment, the STOP list is implemented by a bitmap that includes a respective bit to correspond to each respective consumer PX process. To record the identifier of a particular consumer PX process on the STOP list, the producer PX process sets the bit, in the bitmap, that corresponds to the particular consumer PX process.

Producer PX processes produce results for all consumer PX processes that are not recorded on the STOP list. In this way, recording the identifier of a given consumer PX process on the STOP list of a producer PX process causes the producer PX process to focus processing resources on production of results for the remaining consumer PX processes, and avoids spending resources on preparing rows to send to consumer PX processes that do not require them.

To illustrate, continuing with the above example, when PX process 118 receives a STOP notification from PX process 136, PX process 118 calls its registered callback function to handle the STOP notification. The callback function records an identifier of PX process 136 in the STOP list maintained for PX process 118 and also drops any rows that have been prepared, by PX process 118, to send to PX process 136. Furthermore, after receiving the STOP notification from PX process 136, PX process 118 ignores any rows that the process identifies as being destined for PX process 136.

Figure 3B:
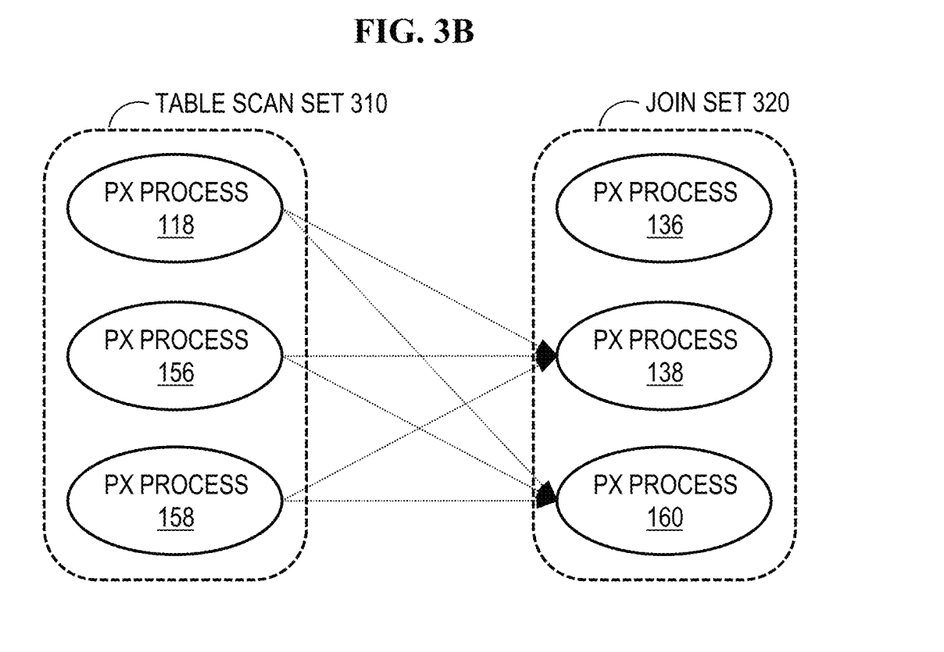

FIGS. 3A and 3B respectively illustrate the interactions between producer set 310 and consumer set 320 before and after receipt of a first STOP notification, i.e., from PX process 136. Specifically, as depicted in FIG. 3A, prior to receiving any STOP notifications from consumer set 320, each of the producer PX processes generates and, as appropriate, sends results to each of the consumer PX processes. Subsequently, PX process 136 sends a STOP notification to all of the producer PX processes, as described above. As depicted in FIG. 3B, after receiving the STOP notification from PX process 136, the producer PX processes continue to generate and, as appropriate, send results to PX process 138 and to PX process 160. However, based on the received STOP notification, the producer PX processes no longer prepare results for, or send results to, PX process 136.

Stop Notification Received from all Consumer Processes

According to one or more embodiments, in response to receiving a STOP notification from a consumer PX process that has not sent out a STOP notification before, a producer PX process also increments a counter maintained by the producer PX process. This counter allows the producer PX process to quickly identify whether all of the consumer PX processes have sent out STOP notifications. Specifically, in response to determining that the counter maintained for a given producer PX process has reached the total number of consumer PX processes, the producer PX process immediately ceases performing the table scan operation given that none of the consumer PX processes require the results of the table scan. In this way, the producer PX processes immediately cease to perform the table scan operation upon determining that all consumer PX processes have sent out STOP notifications, whether or not the table scan operation has been completed. The producer PX processes are then reassigned to another task for the distributed operation, or are released back to the pool of available PX processes maintained by cDBMS 102 to await assignment to another database operation.

When the producer PX processes cease performing the table scan operation prior to completing the table scan operation, embodiments allow the cDBMS to conserve computing resources because the unnecessary table scan operation is cut short based on local decisions by the consumer PX processes. Computing resources that would be required to complete the table scan and package results for transmission over the network are conserved, and the operation requires less network bandwidth, CPU, and memory than would be used if the table scan task were to run to completion.

Performance Gains

Using prior techniques, it was possible that implementing a particular join operation in parallel could take longer than running the same join operation serially. However, embodiments increase the efficiency of running operations by an order of magnitude. As described above, in response to determining that a build table maintained by a consumer process is empty of rows, the consumer process sends a network flow control message with a STOP notification to all producer processes producing rows for the consumer process. The STOP notification indicates that that the consumer process does not require results of the table scan operation being performed by the producer processes. As such, embodiments save computing resources that would be needed to prepare unneeded rows for the consumer process, and also conserves network bandwidth by allowing producers to send, to consumers, only those rows that are needed for the distributed operation by the consumer processes.

Furthermore, once the producer processes executing a particular sub plan receive STOP notifications from all of the consumer processes consuming rows from the producer processes, the producer processes collectively, immediately, and automatically stop the current sub plan execution without requiring completion of the sub plan. Thus, embodiments significantly improve the query execution performance by allowing the consumer processes to make local determinations of the necessity of continuing to receive data from the producer processes and, upon all consumer processes determining that it is no longer necessary to receive data from producer processes, cutting the sub plan being executed by producer processes short, which avoids scanning and distributing data, by producer processes, that is not needed for execution of the distributed operation. This technique can result in significant savings of computing resources, such as CPU, network, and memory.

Figure 4:
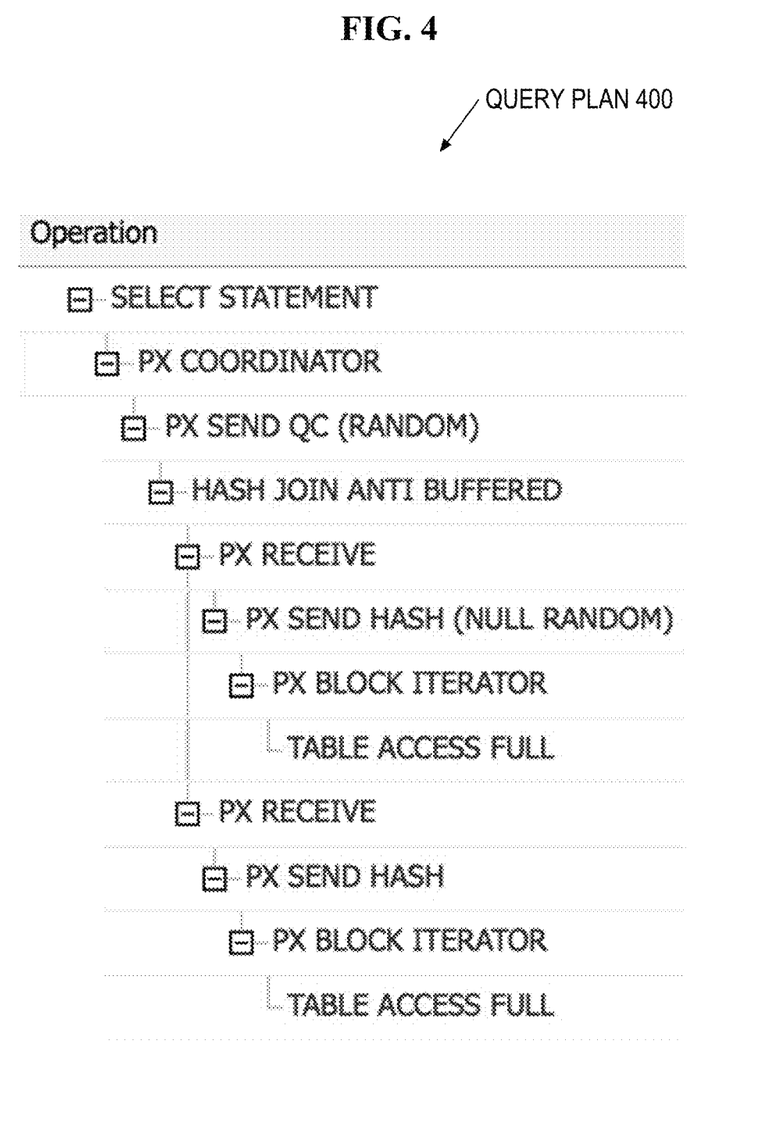
FIG. 4 depicts an example query plan.

The following are examples of test data demonstrating the performance gains on the scale of an order of magnitude by embodiments. For example, FIG. 4 depicts a query plan 400 that, according to one query instance, would take 31 seconds duration and 1.5 minutes of database time using prior techniques, but according to embodiments takes 4.2 milliseconds duration and 11.2 milliseconds of database time. Also, another query instance with a similar query plan to query plan 400 would take 28 seconds duration and 1.4 minutes of database time using prior techniques, but according to embodiments takes 4.4 milliseconds duration and 10.8 seconds of database time. Thus, embodiments greatly improve the processing speed with which a cDBMS may process distributed operations.

Database Management Systems

A database management system (DBMS), such as cDBMS, manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In an embodiment, a DBMS may be connected to or include a cluster of nodes that may store one or more tables. The DBMS may manage tables stored on the cluster of nodes similar to managing tables stored on persistent storage.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issues a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system, such as a cDBMS, is made up of interconnected nodes that share access to the same database (in either a shared-all or shared-nothing configuration). In a shared system, the nodes are interconnected via a network and share access, in varying degrees, to shared storage such as storage 120, e.g. shared access to a set of disk drives and data blocks stored thereon. FIG. 1 depicts such a shared storage system. However, embodiments may be implemented by a shared-nothing cDBMS. The nodes in a multi-node database system may be in the form of a group of computers (e.g. work stations, personal computers), such as server devices 112, 132, and 152, that are interconnected via a network. Alternately, server devices 112, 132, and 152 may represent the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance", such as database server instances 114, 134, and 154. A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
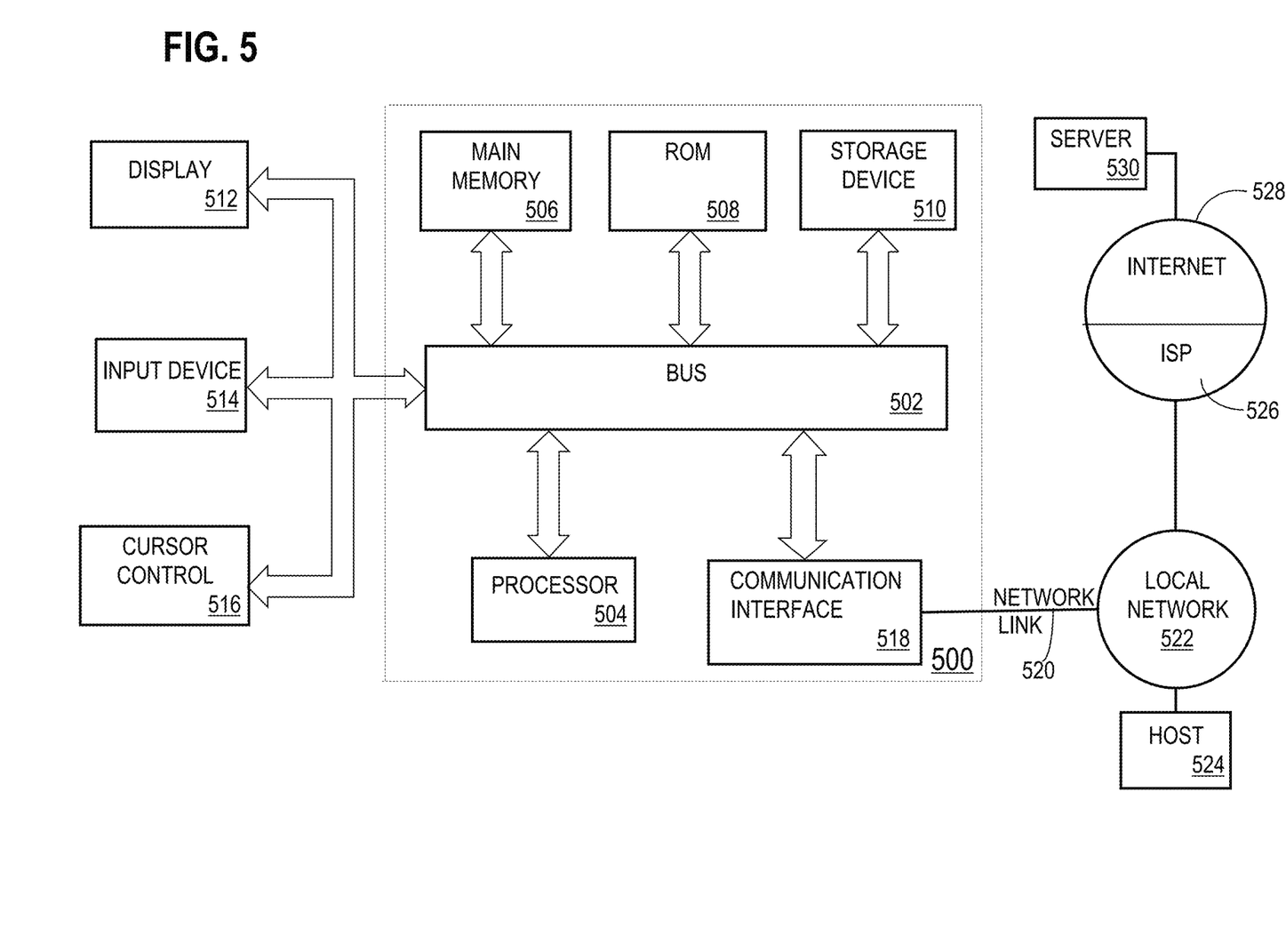
FIG. 5 is a block diagram of a computer system on which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
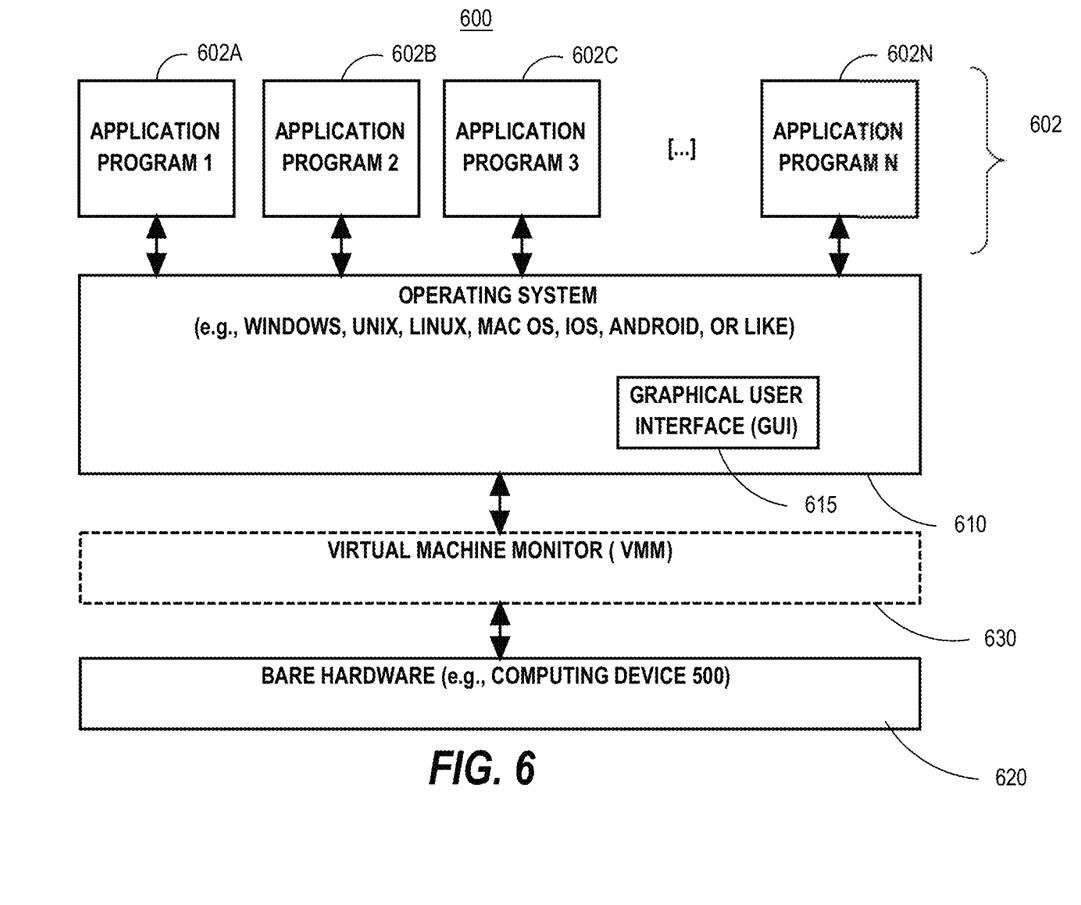
FIG. 6 is a block diagram of a basic software system that may be employed for controlling the operation of a computer system.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of a database management system (DBMS) performing a distributed operation for a query over two database objects comprising:
    generating an execution plan to execute the distributed operation for the query;
    wherein the execution plan includes both (a) a table scan operator that targets a particular database object of the two database objects, and (b) a second operator that consumes results of the table scan operator;
    assigning a first set of parallel execution processes, of the DBMS, to perform a first operation that corresponds to the table scan operator;
    assigning a second set of parallel execution processes, of the DBMS, to perform a second operation that corresponds to the second operator;
    a first process, of the first set of parallel execution processes, beginning to produce results for a second process, of the second set of parallel execution processes, for a portion of the first operation by scanning a portion of the particular database object;
    determining, by the second process, that the second process does not require any rows produced by the first operation;
    responsive to said determining that the second process does not require any rows produced by the first operation:
        the second process sending a notification to the first process; and
        in response to receiving the notification, the first process ceasing to produce results, for the second process, of the portion of the first operation.

2. The method of claim 1, wherein the second process sending the notification to the first process further comprises the second process sending the notification to the first set of parallel execution processes.

3. The method of claim 1, further comprising, in response to receiving the notification:
    the first process recording an identifier of the second process in a STOP list, to produce a record of the identifier of the second process in the STOP list;
    wherein the first process ceasing to produce results, for the second process, of the portion of the first operation is based on the record of the identifier of the second process in the STOP list.

4. The method of claim 1, further comprising:
    in response to receiving the notification, the first process incrementing a particular counter;
    the first process determining whether the particular counter equals a total count of the second set of parallel execution processes;
    in response to the first process determining that the particular counter equals the total count of the second set of parallel execution processes, the first process immediately ceasing to perform the first operation.

5. The method of claim 1, wherein the distributed operation is one of: a join operation; a union operation; an intersect operation; or a minus operation.

6. The method of claim 1, wherein determining that the second process does not require any rows produced by the first operation is based on the second process, in connection with performing the second operation, detecting a build table that includes no rows.

7. The method of claim 1, further comprising, after the first process ceasing to produce results, for the second process, of the portion of the first operation, the first process producing results, of the first operation, for other processes in the second set of parallel execution processes.

8. The method of claim 1, further comprising:
    the first process completing the first operation; and
    the first process sending results for the completed first operation to any process, of the second set of parallel execution processes, for which the first process has not received a notification.

9. One or more non-transitory computer-readable media storing instructions that, when executed by one or more processors, cause a database management system (DBMS) to perform a distributed operation for a query over two database objects comprising:

generating an execution plan to execute the distributed operation for the query;

wherein the execution plan includes both (a) a table scan operator that targets a particular database object of the two database objects, and (b) a second operator that consumes results of the table scan operator;

assigning a first set of parallel execution processes, of the DBMS, to perform a first operation that corresponds to the table scan operator;

assigning a second set of parallel execution processes, of the DBMS, to perform a second operation that corresponds to the second operator;

a first process, of the first set of parallel execution processes, beginning to produce results for a second process, of the second set of parallel execution processes, for a portion of the first operation by scanning a portion of the particular database object;

determining, by the second process, that the second process does not require any rows produced by the first operation;

responsive to said determining that the second process does not require any rows produced by the first operation:
the second process sending a notification to the first process; and
in response to receiving the notification, the first process ceasing to produce results, for the second process, of the portion of the first operation.

10. The one or more non-transitory computer-readable media of claim 9, wherein the second process sending the notification to the first process further comprises the second process sending the notification to the first set of parallel execution processes.

11. The one or more non-transitory computer-readable media of claim 9, wherein the instructions further comprise instructions that, when executed by one or more processors cause, in response to receiving the notification:
the first process recording an identifier of the second process in a STOP list, to produce a record of the identifier of the second process in the STOP list;
wherein the first process ceasing to produce results, for the second process, of the portion of the first operation is based on the record of the identifier of the second process in the STOP list.

12. The one or more non-transitory computer-readable media of claim 9, wherein the instructions further comprise instructions that, when executed by one or more processors cause:
in response to receiving the notification, the first process incrementing a particular counter;
the first process determining whether the particular counter equals a total count of the second set of parallel execution processes;
in response to the first process determining that the particular counter equals the total count of the second set of parallel execution processes, the first process immediately ceasing to perform the first operation.

13. The one or more non-transitory computer-readable media of claim 9, wherein the distributed operation is one of: a join operation; a union operation; an intersect operation; or a minus operation.

14. The one or more non-transitory computer-readable media of claim 9, wherein determining that the second process does not require any rows produced by the first operation is based on the second process, in connection with performing the second operation, detecting a build table that includes no rows.

15. The one or more non-transitory computer-readable media of claim 9, wherein the instructions further comprise instructions that, when executed by one or more processors cause, after the first process ceasing to produce results, for the second process, of the portion of the first operation, the first process producing results, of the first operation, for other processes in the second set of parallel execution processes.

16. The one or more non-transitory computer-readable media of claim 9, wherein the instructions further comprise instructions that, when executed by one or more processors cause:
the first process completing the first operation; and
the first process sending results for the completed first operation to any process, of the second set of parallel execution processes, for which the first process has not received a notification.

* * * * *